Oct. 11, 1938.  C. KANNEL  2,132,421
VENTILATING MEANS FOR VEHICLES
Filed Oct. 22, 1936
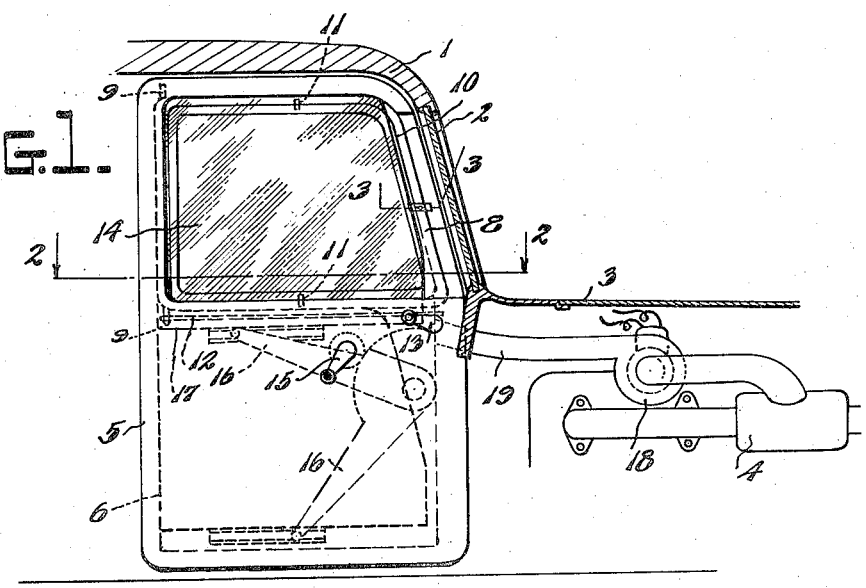
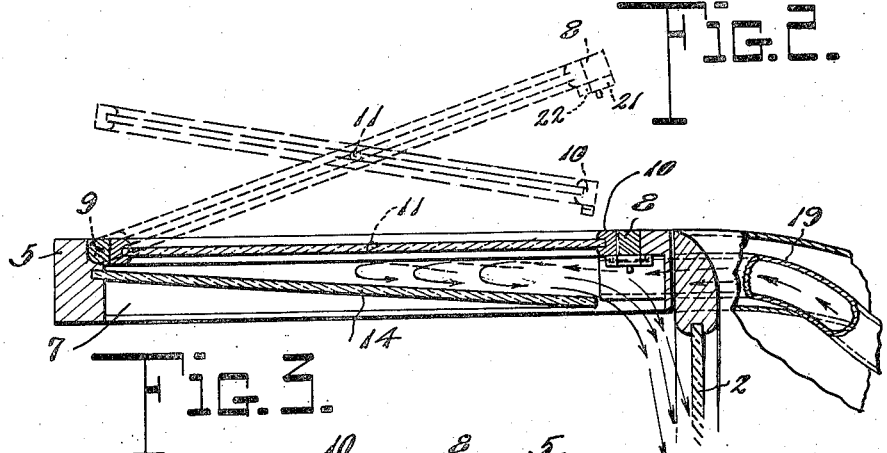
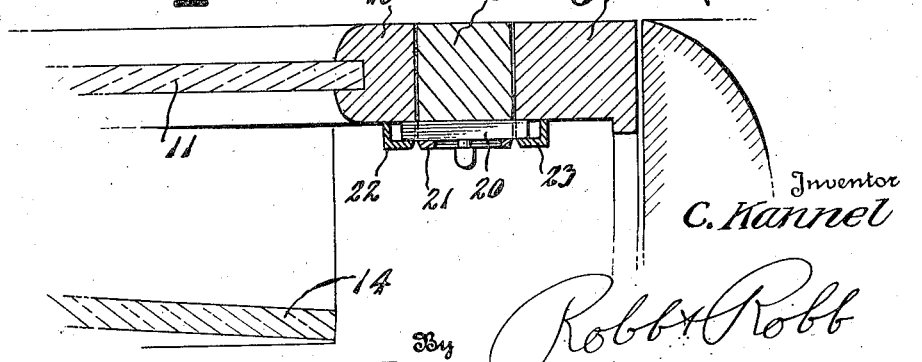

Patented Oct. 11, 1938

2,132,421

UNITED STATES PATENT OFFICE 2,132,421

VENTILATING MEANS FOR VEHICLES

Charles Kannel, Cleveland, Ohio

Application October 22, 1936, Serial No. 107,078

11 Claims. (Cl. 296—44)

The present invention relates to improvements in ventilating means for vehicles, and has for its primary object the provision of a novel window closure capable of bodily angular adjustment to positions exterior of the vehicle body for the purpose of deflection of a stream of air into the vehicle, and supplemental independent panel adjustment for use in providing "no draft" ventilation or modified deflection of the air stream.

A further object in view is to provide an auxiliary deflector for use in conjunction with the main window closure by means of which air may be admitted into the vehicle and directed away from the passengers.

In another aspect, my invention embodies an exterior window closure shiftable for action as a wind deflector to direct air into the vehicle, in combination with an adjustable inner deflector for directing the incoming air against the windshield to prevent sweating on the inner surface thereof and provide ventilation without permitting rain or dust to contact with the passengers while the window is open for ventilating purposes.

A still further object in view is to provide a deflector means in combination with heating means by which heated air may be deflected into the body of the vehicle and against the windshield to prevent frosting either exteriorly or interiorly of the latter.

Other and further objects and advantages of the invention will be hereinafter set forth and the novel features thereof defined by the appended claims.

In the drawing:

Figure 1 is a fragmentary sectional view of a vehicle body having my invention applied thereto;

Figure 2 is a horizontal sectional view taken about on the plane indicated by line 2—2 of Figure 1, and showing in dotted lines one of the positions of adjustment of both the closure unit and its movable panel; and Figure 3 is an enlarged sectional view taken on the line 3—3 of Figure 1.

Like reference characters designate corresponding parts in the several figures of the drawing.

Referring to the drawing, 1 designates a conventional type of automotive vehicle body inclusive of the usual windshield 2, the hood 3, and motor assembly 4, more or less diagrammatically shown. It is to be understood that the invention herein set forth may be applied to any type of movable vehicle, and the construction which is illustrated herein is merely for the purposes of exemplification of the invention.

The vehicle is provided, as customary, with a door 5 having the usual well 6 and window opening 7. This opening is provided with a window closure which comprises the main frame 8 pivoted on a vertical axis 9 at its rear end and a supplemental window panel or inner frame and glass 10 which is pivotally mounted intermediate its length in the main frame 8, as at 11. It will be observed, by reference to Figure 2, that this window closure is flush with the exterior of the vehicle body, and, when in its closed position, no interference of the stream line is produced. However, when it is desired to admit air into the vehicle body, this may be done in two ways. The complete window closure may be swung on its rear pivot 9 into any angular position exteriorly of the body, and held in such position by any suitable means such, for instance, as the worm shaft 12 engaging with the pivot 9 and operated by a suitable hand crank 13 mounted interiorly of the door. This operating mechanism may be of any desired type, and, therefore, the specific construction illustrated herein is more or less generally shown in sufficient detail for one skilled in the art to understand its application. When the window unit is thus adjusted, the full opening is available for admitting the air into the vehicle, which would take place by deflection due to the projection of the window outwardly into the air stream. Such direct admission of the air into the vehicle body might be objectionable under certain conditions, and, therefore, I prefer to employ in conjunction with this deflector closure an auxiliary deflector device. This latter deflector is also mounted within the door, which is usually of sufficient thickness to accommodate the arrangement herein disclosed. The auxiliary deflector consists of a glass panel 14 which is vertically slidable upwardly and downwardly in the door frame and disposed at a slight angle inwardly of the vehicle door, as clearly shown in Figure 2 of the drawing. This auxiliary closure means or deflector, as above termed, is operated vertically by the conventional actuating means including the crank 15 and actuating arm 16 slidably connected to the deflector support 17, so that, as shown in dotted lines in Figure 1, when this panel is not desired it may be lowered into the well 6 of the door. When in its elevated position, however, it acts as a baffle to deflect the air stream which is directed inwardly of the window opening by the main deflector unit. Under such condition, the air is trapped between these elements and forced to take a forward movement, as shown by the arrows in Figure 2, against the windshield and away from the position occupied by the passengers within the vehicle body. It is obvious that the inner panel 14 may be adjusted to any intermediate position of elevation so as to allow some of the air to be admitted, for instance, over the heads of the passengers, and the remaining portion of the air to be deflected in the manner above described.

When the vehicle is operated in rainy weather, it will be obvious that the window opening may be more or less utilized to admit air into the vehicle body while preventing the rain from passing directly through the opening and wetting the passengers. In like manner, dust will be prevented from passing directly into the vehicle, so that at all times ventilation may be afforded under the varying conditions above referred to.

In the winter time, this arrangement is particularly useful when combined with heating means, such as that disclosed in the drawing, wherein a manifold heater 18 is provided with a conduit 19 extending into the space between the inner and outer walls of the body frame at a point opposite the base of the space between the outer and inner deflector means above described. When the outer window closure is in its closed position, and the deflector 14 is elevated, the heated air will be trapped and shunted by these members against the inner face of the windshield, as shown by the arrow lines in Figure 2, thus preventing frosting of the windshield glass in freezing conditions.

I have now described the operation of the outer or main closure unit under conditions in which the auxiliary panel 10 is in its closed position with respect to the main frame 8, but it is to be understood that this auxiliary panel 10 may be shifted about it pivotal axis 11 into an angular position without moving the main frame 8 from its closed position, or even when the main frame is in any angular position. Thus, it is possible to employ the auxiliary panel 10 as a "no draft" ventilator deflector enabling a greater degree of control of the movement of air admitted into the vehicle. This auxiliary panel, when adjusted to an angular position with the main frame 8 in its closed position, will permit the air to be thrown inwardly and rearwardly or transversely of the vehicle body in a manner provided by ventilating deflectors now on the market.

I have provided in conjunction with this main closure unit a novel locking means which is best understood from the disclosure in Figure 3. Upon the main frame 8 I mount a slide bolt 20 in a casing 21, which bolt is of a sufficient length to normally extend across the main frame 8 into overlapping relation to the door at the front and the auxiliary frame or panel 10 at its rear end. On the panel 10 is mounted a keeper 22, and on the door is mounted a second keeper 23, so that, when the window closure is to be opened, the bolt 20 is shifted rearwardly until its forward end escapes from the keeper 23 and the door frame. The full closure member may then be swung outwardly on its vertical axis 9.

When it is desired to open the panel 10 only however, the bolt 20 is shifted forwardly until the rear end escapes from the keeper 22 and the edge of the panel, thus freeing the latter to swing inwardly or outwardly at its forward end, as the case may be.

It will be understood that the ventilating means hereinbefore set forth do not necessarily have to be mounted in a door, because, in certain large vehicle constructions, such an arrangement could be employed in conjunction with any ordinary window opening in the body, and each opening thus provided with controllable ventilating means.

It is obvious that slight changes may be made in the details of construction of this invention without departing from the spirit thereof and within the scope of the claims hereto appended.

Having thus described my invention, what I claim as new and desire to secure by Letters Patent is:

1. In combination with a vehicle body having a window opening, a window to close said opening comprising a main frame pivoted at its rear end to the rear of the window opening to swing the other end outwardly of the opening, and an auxiliary transparent panel having vertical pivots disposed intermediate its length and pivotally connecting the panel to the main frame to swing the forward end of the panel inwardly or outwardly of the main frame or of the body opening, said main frame and panel being co-extensive with the body opening so as to constitute a closure therefor, when the frame and panel are aligned and in closed position.

2. In combination with a vehicle body having a window opening, a window to close said opening comprising a main frame pivoted at one end to swing its other end from the window opening, and an auxiliary panel pivotally mounted intermediate its ends in the main frame to swing independently of the main frame, combined with a locking member common to both the main frame and auxiliary panel and shiftable in one direction to release the main frame and in another direction to release the auxiliary panel.

3. In combination with a vehicle body having a window opening, a window closure comprising a frame pivotally mounted in said opening to swing therefrom, a panel mounted in said frame to swing with the main frame, pivot means for said panel enabling the panel to swing into angular position relative to the frame, and a lock device mounted on the frame and engageable with the edge of the opening and the edge of the panel to hold the panel locked to the frame or both the frame and panel in closed position in the window opening.

4. A vehicle body having a window opening therein, a window closure for said opening, a vertically movable deflector mounted inwardly and in a fixed angular position relative to the closure so as to form a substantially V-shaped pocket therebetween, and means for independently adjusting the vertical deflector relative to the window opening and closure.

5. A construction as set forth in claim 4 wherein the window closure is mounted to swing horizontally and the deflector is mounted to shift upwardly and downwardly, combined with means for adjusting said closure and deflector as before mentioned.

6. A vehicle body having a window opening, a deflector mounted in said opening in fixed angular position to project inwardly of the body, means for moving the deflector upwardly and downwardly relatively to the opening while in said angular position, an open frame pivotally mounted at its inner end in the rear end of the window opening shiftable outwardly of the opening into the air stream, a transparent panel pivoted centrally within the frame and when alined therewith constituting a closure for the window opening and in the outward swung position of the open frame adjustable to angular positions for deflecting the air away from the deflector aforesaid and toward the deflector independently of the adjustment of the open frame.

7. A vehicle body having a window opening, a window closure mounted in said opening, a deflector mounted within the body in spaced relation to the closure to form a deflector pocket, and means for directing heated air into said pocket.

8. A vehicle body having a windshield and a window opening adjacent thereto, a window closure mounted in said opening, a deflector mounted within the body in spaced relation to the closure to form a deflector pocket with its open end adjacent the windshield, and means for directing heated air into said pocket to be deflected thereby against the inside of the windshield.

9. In combination, a vehicle body, including a windshield and a window opening adjacent thereto, a window closure for said opening adjustable to swing outwardly of the vehicle body to deflect air through said opening and into the body, means for shifting said closure and holding it in shifted position, a deflector slidably mounted in the body upwardly and downwardly with respect to the opening, means for raising and lowering said deflector, the deflector being normally disposed at an angle to form a substantially V-shaped pocket for directing the air passing through the opening in a forward direction against the inside of the windshield.

10. In combination, a vehicle body including a door having a window opening therein, a windshield adjacent said door, a window closure mounted in the door opening to swing outwardly relative to the vehicle body, a deflector panel slidably mounted in the door for movement over the window opening or below the same, said deflector panel projecting inwardly of the door opening and extending to a point adjacent but spaced from the windshield, means for directing a stream of heated air into the space between the closure and the deflector panel, and means for adjusting the closure and said panel relative to the opening and to each other.

11. A vehicle body having a window opening therein, a closure for said opening adjustable in a horizontal direction to swing outwardly of the body, and a separate panel member disposed in angular position in the opening extending substantially to the forward end of the closure aforesaid and adjustable in a vertical direction.

CHARLES KANNEL.